US010335330B2

(12) United States Patent
Omer et al.

(10) Patent No.: US 10,335,330 B2
(45) Date of Patent: Jul. 2, 2019

(54) MOTOR-DRIVEN CHAIR STEERED BY SEAT ROTATION

(71) Applicant: Travelsys4u Ltd., Ramat Hasharon (IL)

(72) Inventors: Galin Omer, Ramat Hasharon (IL); Eyal Dolev, Ann Arbor, MI (US); Ehud Nagler, Kiryat Tivon (IL); Sharon Shulshtein, Kibbutz Gazit (IL); Amit Nir, Pardes Hana (IL); Shlomi Avital, Pardes Hana (IL); Shay Cohen, Ramat Hasharon (IL)

(73) Assignee: TRAVELSYS4U LTD., Ramat Hasharon (IL)

( * ) Notice: Subject to any disclaimer, the term of this patent is extended or adjusted under 35 U.S.C. 154(b) by 83 days.

(21) Appl. No.: 15/447,146

(22) Filed: Mar. 2, 2017

(65) Prior Publication Data

US 2018/0250179 A1 Sep. 6, 2018

(51) Int. Cl.
*A61G 5/04* (2013.01)
*A61G 5/08* (2006.01)
*A61G 5/10* (2006.01)
*B60N 2/00* (2006.01)

(52) U.S. Cl.
CPC .............. *A61G 5/043* (2013.01); *A61G 5/08* (2013.01); *A61G 5/1051* (2016.11); *A61G 5/1078* (2016.11); *B60N 2/00* (2013.01)

(58) Field of Classification Search
CPC ......... A61G 5/1078; A61G 5/043; A61G 5/08
See application file for complete search history.

(56) References Cited

U.S. PATENT DOCUMENTS

| 3,862,751 A | * | 1/1975 | Schwaller | ............... F16F 1/125 137/512.5 |
| 3,917,312 A | | 11/1975 | Rodaway | |
| 3,938,608 A | * | 2/1976 | Folco-Zambelli | ..... A47C 7/006 180/21 |

(Continued)

FOREIGN PATENT DOCUMENTS

| AT | 384734 | 12/1987 |
| CA | 2211731 | 2/1999 |

(Continued)

OTHER PUBLICATIONS http://www.discovermymobility.com/store/powerwheelchairs/green-transporter/ez-ultra-lit . . . Aug. 21, 2016; The Air Hawk Electric Foldable Wheelchair.

(Continued)

*Primary Examiner* — Nicole T Verley
(74) *Attorney, Agent, or Firm* — Mark M. Friedman (57) ABSTRACT

A motor-driven chair has a central drive wheel located beneath the seat and linked so as to be aligned with the facing direction of the seat. A user turns the direction of motion by rotating the seat relative to a surrounding stabilizer assembly so as to turn the seat and the drive wheel towards a direction in which he wishes to move. A suspension arrangement maintains a desired distribution of user load between the drive wheel and the stabilizer assembly. A combination of fixed-axis wheels with castered wheels provides angular anchoring of the stabilizer assembly to facilitate the seat steering process. The entire structure is preferably foldable for easy transportation and storage.

11 Claims, 12 Drawing Sheets

(56) References Cited

U.S. PATENT DOCUMENTS

| | | | | |
|---|---|---|---|---|
| 3,968,991 | A | * | 7/1976 | Maclaren .................. A61G 5/08 297/45 |
| 4,118,020 | A | * | 10/1978 | Myers .................... B62D 55/30 213/42 |
| 4,221,273 | A | | 9/1980 | Finden |
| 4,245,847 | A | | 1/1981 | Knott |
| 4,274,503 | A | | 6/1981 | Mackintosh |
| 4,403,673 | A | | 9/1983 | Ball |
| 4,513,832 | A | | 4/1985 | Engman |
| 5,016,720 | A | | 5/1991 | Coker |
| 5,183,133 | A | * | 2/1993 | Roy ........................ A61G 5/043 180/13 |
| 5,236,055 | A | * | 8/1993 | Legal ..................... A61G 5/043 180/65.51 |
| 5,364,120 | A | | 11/1994 | Shimansky |
| 5,435,404 | A | | 7/1995 | Garin, III |
| 5,445,233 | A | * | 8/1995 | Fernie .................... A61G 5/043 180/6.5 |
| 5,482,261 | A | * | 1/1996 | Ortega ..................... F16F 3/06 267/166 |
| 5,651,422 | A | | 7/1997 | Casali |
| 5,690,185 | A | | 11/1997 | Sengel |
| 5,944,131 | A | | 8/1999 | Schaffner et al. |
| 6,000,486 | A | * | 12/1999 | Romick .................. B62B 3/008 180/209 |
| 6,179,076 | B1 | * | 1/2001 | Fernie .................... A61G 5/043 180/65.1 |
| 6,196,343 | B1 | | 3/2001 | Strautnieks |
| 6,199,647 | B1 | | 3/2001 | Schaffner et al. |
| 6,209,670 | B1 | * | 4/2001 | Fernie .................... A61G 5/043 180/11 |
| 6,279,927 | B1 | | 8/2001 | Nishihira et al. |
| 6,341,657 | B1 | | 1/2002 | Hopely, Jr. et al. |
| 6,460,641 | B1 | * | 10/2002 | Kral ....................... A61G 5/043 180/209 |
| 6,543,798 | B2 | | 4/2003 | Schaffner et al. |
| 6,601,863 | B1 | | 8/2003 | Mentessi et al. |
| 6,616,172 | B1 | * | 9/2003 | Cockram ................ A61G 5/08 280/250.1 |
| 6,640,916 | B2 | | 11/2003 | Schaffner et al. |
| 6,725,956 | B1 | * | 4/2004 | Lemire ................... A61G 7/08 180/15 |
| 7,104,346 | B2 | | 9/2006 | Schaffner |
| 7,207,403 | B2 | | 4/2007 | Grymko et al. |
| 7,316,282 | B2 | | 1/2008 | Mulhern et al. |
| 7,516,984 | B2 | | 4/2009 | Tang |
| 7,562,903 | B2 | | 6/2009 | Kramer, Jr. et al. |
| 7,766,106 | B2 | | 8/2010 | Puskar-Pasewicz et al. |
| 7,775,310 | B2 | | 8/2010 | Andri |
| 7,828,310 | B2 | | 11/2010 | Vreeswijk et al. |
| 7,882,909 | B2 | * | 2/2011 | Pearlman ............... A61G 5/043 180/23 |
| 7,896,394 | B2 | | 3/2011 | Jackson et al. |
| 7,942,445 | B2 | | 5/2011 | Kramer, Jr. et al. |
| 8,037,953 | B2 | | 10/2011 | Puskar-Pasewicz et al. |
| 8,066,624 | B1 | | 11/2011 | Stroup |
| 8,118,321 | B2 | | 2/2012 | Hunziker et al. |
| 8,177,257 | B2 | * | 5/2012 | Dugas .................... A61G 5/043 180/907 |
| 8,186,463 | B2 | | 5/2012 | Hunziker et al. |
| 8,286,745 | B2 | * | 10/2012 | Kosco .................... B60N 2/502 180/210 |
| 8,292,010 | B2 | | 10/2012 | Puskar-Pasewicz et al. |
| 8,534,685 | B1 | | 9/2013 | Tohm, Sr. |
| 8,919,797 | B2 | * | 12/2014 | Lowenthal ............ A61G 5/1043 280/250.1 |
| 8,925,943 | B2 | | 1/2015 | Molnar |
| 8,960,340 | B2 | * | 2/2015 | Tallino ................... A61G 5/047 180/11 |
| 8,973,926 | B1 | | 3/2015 | Lensing |
| 9,027,678 | B1 | | 5/2015 | Morris et al. |
| 9,050,224 | B2 | | 6/2015 | Slorance |
| 9,050,226 | B2 | | 6/2015 | Husted et al. |
| 9,302,691 | B2 | | 4/2016 | Cheng |
| 9,333,130 | B2 | | 5/2016 | Puskar-Pasewicz et al. |
| 2005/0206124 | A1 | | 9/2005 | Levi |
| 2006/0016651 | A1 | * | 1/2006 | Lin ........................ F16F 1/041 188/322.22 |
| 2006/0007674 | A1 | | 4/2006 | Pauls et al. |
| 2007/0021613 | A1 | | 9/2007 | Potappel |
| 2008/0066974 | A1 | * | 3/2008 | Pearlman ............... A61G 5/043 180/22 |
| 2008/0011598 | A1 | | 5/2008 | Lin |
| 2008/0016913 | A1 | | 7/2008 | Meyer |
| 2008/0202837 | A1 | | 8/2008 | Macedo Ribeiro et al. |
| 2009/0000850 | A1 | | 1/2009 | Hornick et al. |
| 2009/0005038 | A1 | | 2/2009 | Cheng |
| 2009/0025573 | A1 | | 10/2009 | Tseng |
| 2010/0004820 | A1 | | 1/2010 | Bekoscke et al. |
| 2011/0108348 | A1 | | 5/2011 | Mulhern |
| 2011/0253464 | A1 | * | 10/2011 | Chen ...................... A61G 5/043 180/65.1 |
| 2012/0080244 | A1 | * | 4/2012 | Hou ....................... A61G 5/043 180/24.07 |
| 2012/0013837 | A1 | | 6/2012 | Zhou et al. |

FOREIGN PATENT DOCUMENTS

| | | |
|---|---|---|
| DE | 3525234 | 1/1987 |
| EP | 0338689 | 10/1989 |
| EP | 0 820749 | 1/1998 |
| FR | 2399822 | 3/1979 |
| JP | 2001-104391 | 4/2001 |
| WO | 1997025905 | 7/1997 |
| WO | 1997037626 | 10/1997 |
| WO | 2004047709 | 6/2004 |

OTHER PUBLICATIONS http://www.ezlitecruiser.com/ 8/Electric Power Wheelchair Lightweight Folding EZ Lite Cruiser ,Aug. 21, 2016, p. 1-31.

htlp1/www.zingerchair.com/Zinger Chair - Not Just Another Travel Scooter, Aug. 21, 2016.

* cited by examiner

MOTOR-DRIVEN CHAIR STEERED BY SEAT ROTATION

FIELD AND BACKGROUND OF THE INVENTION

The present invention relates to mobility aids and, in particular, it concerns a motor-driven chair that is steered by rotation of the seat.

It is known to provide a wide range of mobility aids for individuals having various levels of limitations. Of particular relevance to the present invention is a category of mobility aids referred to herein as seat-steered motorized chairs, as exemplified by U.S. Pat. No. 5,183,133. In such devices, a central drive wheel located beneath the seat is linked so as to be aligned with the facing direction of the seat. A user turns the direction of motion by rotating her seat relative to a surrounding stabilizing chassis so as to face towards the direction in which she wishes to move.

SUMMARY OF THE INVENTION

The present invention is a motor-driven chair that is steered by rotation of the seat.

According to the teachings of an embodiment of the present invention there is provided, a motor-driven chair for propelling a user over an underlying surface, the chair comprising: (a) a seat element having support surfaces for supporting the user sitting in a seat-facing direction; (b) a seat pole extending downwards from the seat element for supporting the seat element, the seat pole defining a vertical axis; (c) a drive wheel rotatable about a horizontal axis of rotation so as to define a direction of forward motion perpendicular to the axis of rotation, ti e drive wheel being located beneath the seat element substantially on the vertical axis, the drive wheel being mechanically linked to the seat pole so as to maintain the direction of forward motion aligned with the seat-facing direction so that rotation of the seat element about the vertical axis causes a corresponding rotation of the direction of forward motion; (d) a motor in driving connection to the drive wheel so as to drive the drive wheel to rotate about the horizontal axis of rotation, and thereby propel the chair in the seat-facing direction; (e) a stabilizer assembly mechanically linked to the seat pole, the stabilizer assembly comprising a set of stabilizer wheels mounted on a support structure for supporting the seat pole in a vertical orientation, the stabilizer assembly allowing rotation of the seat pole about the vertical axis relative to the support structure; and (f) a suspension arrangement associated with the seat pole, the drive wheel and the stabilizer assembly, the suspension arrangement being configured to distribute a load of the user sitting stably on the seat element so as to maintain a predefined range of proportions between a load supported by the drive wheel and a load supported by the stabilizer wheels.

According to a further feature of an embodiment of the present invention, the suspension arrangement is configured to distribute a load of the user sitting stably on the seat element so that a substantially constant proportion of the user's weight is supported by the drive wheel and a remainder of the user's weight is supported by the stabilizer wheels for users of weight anywhere between 50 kg and 100 kg, the substantially constant proportion being between 30% and 90% of the user's weight.

According to a further feature of an embodiment of the present invention, the suspension arrangement comprises a first suspension spring deployed to transfer load between the seat pole and the drive wheel and a second suspension spring deployed to transfer load between the seat pole and the support structure.

According to a further feature of an embodiment of the present invention, the suspension arrangement comprises a first hydraulic arrangement comprising at least one piston, the first hydraulic arrangement being deployed to transfer load between the seat pole and the drive wheel, and a second hydraulic arrangement comprising at least one piston, the second hydraulic arrangement being deployed to transfer load between the seat pole and the support structure, wherein the first and second hydraulic arrangements are interconnected by a pressure-equalization line.

There is also provided according to the teachings of an embodiment of the present invention, a motor-driven chair for propelling a user over an underlying surface, the chair comprising: (a) a seat element having support surfaces for supporting the user sitting in a seat-facing direction; (h) a seat pole extending downwards from the seat element for supporting the seat element, the seat pole defining a vertical axis; (c) a drive wheel rotatable about a horizontal axis of rotation so as to define a direction of forward motion perpendicular to the axis of rotation, the drive wheel being located beneath the seat element substantially on the vertical axis, the drive wheel being mechanically linked to the seat pole so as to maintain the direction of forward motion aligned with the seat-facing direction so that rotation of the seat element about the vertical axis causes a corresponding rotation of the direction of forward motion; (d) a motor in driving connection to the drive wheel so as to drive the drive wheel to rotate about the horizontal axis of rotation, and thereby propel the chair in the seat-facing direction; (e) a stabilizer assembly mechanically linked to the seat pole, the stabilizer assembly comprising a set of stabilizer wheels mounted on a support structure for supporting the seat pole in a vertical orientation, the stabilizer assembly allowing rotation of the seat pole about the vertical axis relative to the support structure, wherein the set of stabilizer wheels comprises at least one fixed-axis follower wheel and at least one castor wheel mounted so as to swivel to accommodate turning of the chair.

According to a further feature of an embodiment of the present invention, the set of stabilizer wheels comprises at least two fixed-axis follower wheels and at least two castor wheels mounted so as to swivel to accommodate turning of the chair.

There is also provided according to the teachings of an embodiment of the present invention, a motor-driven chair for propelling a user over an underlying surface, the chair comprising: (a) a seat element having support surfaces for supporting the user sitting in a seat-facing direction; (b) a seat pole extending downwards from the seat element for supporting e seat element, the seat pole defining a vertical axis; (c) a drive wheel rotatable about a horizontal axis of rotation so as to define a direction of forward motion perpendicular to the axis of rotation, the drive wheel being located beneath the seat element substantially on the vertical axis, the drive wheel being mechanically linked to the seat pole so as to maintain the direction of forward motion aligned with the seat-facing direction so that rotation of the seat element about the vertical axis causes a corresponding rotation of the direction of forward motion; (d) a motor in driving connection to the drive wheel so as to drive the drive wheel to rotate about the horizontal axis of rotation, and thereby propel the chair in the seat-facing direction; (e) a stabilizer assembly mechanically linked to the seat pole, the stabilizer assembly comprising a set of stabilizer wheels mounted on a support structure for supporting the seat pole in a vertical orientation, the stabilizer assembly allowing rotation of the seat pole about the vertical axis relative to the support structure, wherein the support structure comprises a center portion mechanically linked to the seat pole, a front portion hingedly connected to the center portion at a first hinge axis and supporting two front wheels from the set of stabilizer wheels, and a rear portion hingedly connected to the center portion at a second hinge axis and supporting two rear wheels from the set of stabilizer wheels, wherein the first and second hinge axes are parallel axes.

According to a further feature of an embodiment of the present invention, the front wheels are castor wheels mounted to the front portion via folding wings foldable along a secondary hinge axis non-parallel to the first hinge axis, the support structure further comprising a linkage deployed to fold the wings from a deployed position to a folded position as the front portion is rotated about the first hinge.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a motor-driven chair that is steered by rotation of the seat.

The principles and operation of motor-driven chairs according to the present invention may be better understood with reference to the drawings and the accompanying description.

Referring now to the drawings, FIGS. 1A-13 illustrate various aspects and variants of a motor-driven chair, generally designated 10, for propelling a user over an underlying surface. In general terms, chair 10 has a seat element 12 having support surfaces 14, 16 for supporting the user sitting in a "seat-facing direction". A seat pole 18 extends downwards from seat element 12 for supporting the seat element. Seat pole 18 may be taken to define a vertical axis 20. A drive wheel 22, rotatable about a horizontal axis of rotation so as to define a direction of forward motion F perpendicular to the axis of rotation, is located beneath seat element 12 substantially on vertical axis 20. Drive wheel 22 is mechanically linked to seat pole 18 so as to maintain the direction of forward motion F aligned with the seat-facing direction of seat element 12 so that rotation of the seat element about vertical axis 20 causes a corresponding rotation of direction of forward motion F.

A motor, typically implemented as a hub motor within drive wheel 22 and not shown here in detail, is in driving connection to drive wheel 22 so as to drive the drive wheel to rotate about its horizontal axis of rotation, and thereby propel the chair in the seat-facing direction. In order to maintain stability of chair 10, a stabilizer assembly 24 is mechanically linked to seat pole 18. Stabilizer assembly 24 includes a set of stabilizer wheels 26, 28 mounted on a support structure, here formed from a mid-portion 30 with associated front and back frames 32 and 34, so as to support seat pole 18 in a vertical orientation. Stabilizer assembly 24 is configured to allow rotation of seat pole 18 about vertical axis 20 relative to the support structure.

In this context, various aspects of the present invention provide a number of particularly advantageous features relating to implementation of chair 10. Specifically, according to a first non-limiting set of particularly preferred embodiments of the present invention, chair 10 is provided with a suspension arrangement associated with seat pole 18, drive wheel 20 and stabilizer assembly 24, that is configured to distribute a load of a user sitting stably on seat element 12 so as to distribute the load supported by drive wheel 20 and stabilizer assembly 24 according to desired proportions. Specifically, the implementation of the suspension arrangement is preferably such that both the load on the stabilizer assembly and on the drive wheel vary in correlation to the weight supported by seat element 12.

The significance of this feature may best be understood by contrast to certain prior devices of the central-drive-wheel, seat-steered type, such as U.S. Pat. No. 5,183,133, where a spring biases the outrigger frame downwards with a fixed force while all remaining load is applied rigidly to the drive wheel. Such a structure leads to extreme variations on the load applied to the drive wheel, which may result in loss of traction for small loads and instability of the device at high loads.

In contrast, according to a first aspect of certain particularly preferred implementations of the present invention, the suspension arrangement associated is configured to distribute a load of a user sitting stably on seat element 12 and passing downwards through with seat pole 18 so as to be distributed between drive wheel 20 and stabilizer assembly 24 according to desired proportions. Specifically, instead of the load on the stabilizer assembly 24 (or alternatively, on drive wheel 20) being fixed, the load on each preferably increases monotonically as a function of increasing load, preferably over the entire range of normal bodyweight to which the device is intended to cater, for example, at least between 50 kg and 100 kg.

Figure 6:
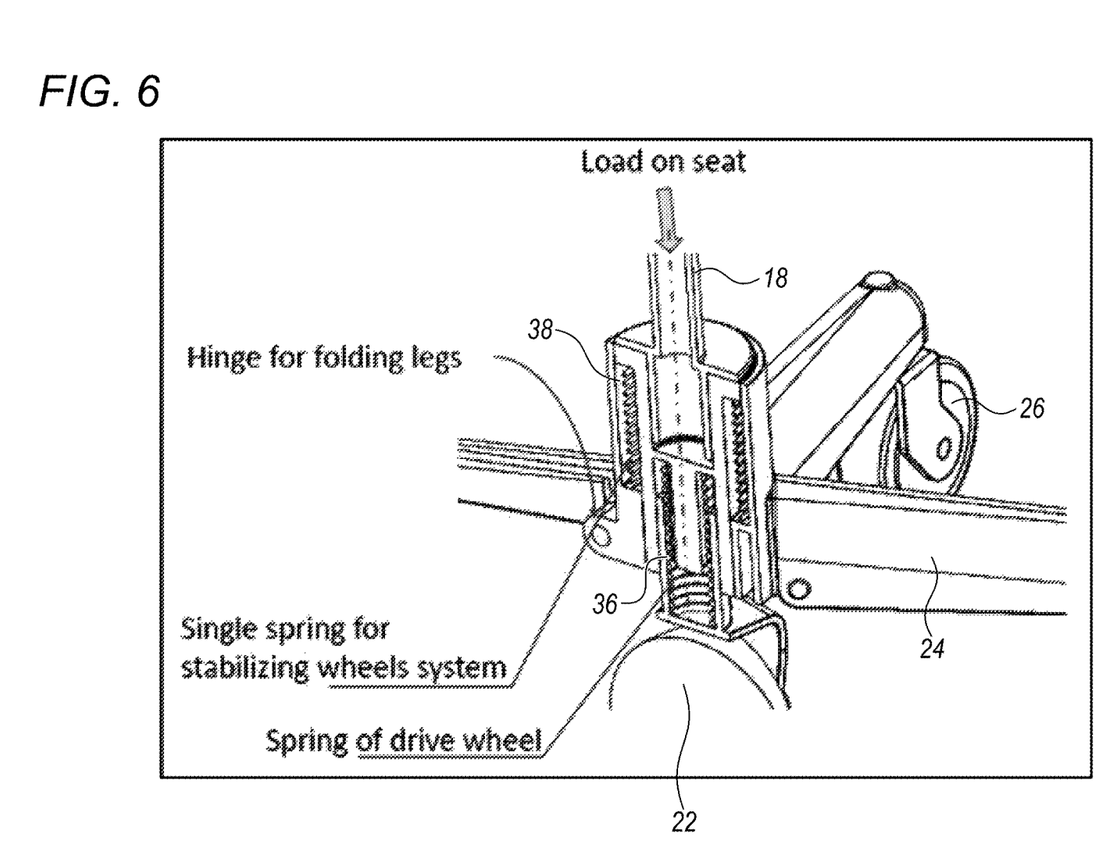
FIG. 6 is a cut-away isometric view of a suspension arrangement from a motor-driven chair according to a variant implementation of the present invention.

According to a first particularly preferred set of embodiments, the aforementioned suspension arrangement is implemented using a first spring arrangement to transfer load from seat pole 18 to drive wheel 20, and a second spring arrangement to transfer load from seat pole 18 to stabilizer assembly 24. In a first example best seen in FIG. 2B, the first spring arrangement is implemented as a first helical compression spring 36, and the second spring arrangement is implemented as a second helical compression spring 38. In the case illustrated here, compression spring 36 is deployed in an inner channel, while compression spring 38 is deployed in an annular channel surrounding the inner channel. Another functionally-equivalent suspension arrangement, similarly labeled, is illustrated in FIG. 6, where the components are visually clearer. (This arrangement is equivalent to that of FIG. 2B, other than that the stabilizer assembly 24 is implemented in a different manner, with is radially-projecting folding arms 40 about a central portion 42, here implemented as a cylinder, each folding arm 40 supporting a caster wheel 26.)

In the above examples, subdivision of the load on the seat between the drive wheel and the stabilizer assembly occurs based on the relative spring constants of the two spring arrangements, adjusted according to any initial offset between their respective states of loading in their starting positions (i.e., unequal preloading). In the absence of any offset, the proportions of the load transferred to the drive wheel and the stabilizer assembly remains constant as the load varies. If an offset is provided, the proportions may vary, but in each case, the load on both the drive wheel and the stabilizer assembly increase monotonically as a function of increasing load, thereby maintaining the weight distribution within predefined limits that ensure reliable driving engagement with the floor and stability of the structure while in use with a wide range of user weights. In most particularly preferred implementations, the distribution of the load on the seat is maintained within the range of 30% to 90% of the user's weight on the drive wheel, with the remaining weight transferred via the stabilizer assembly.

Figure 10:
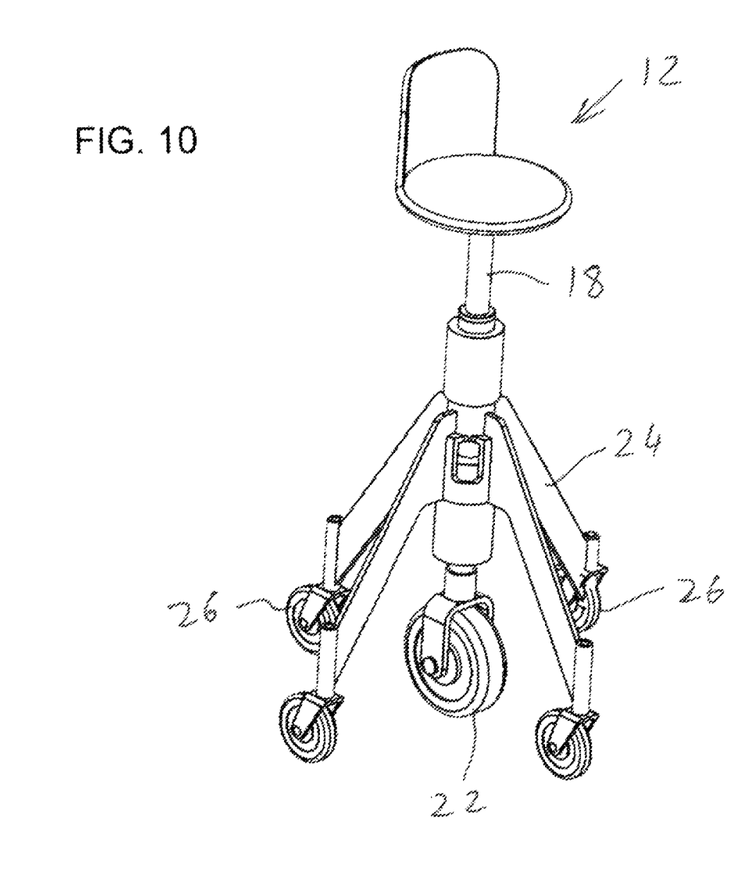
FIG. 10 is a schematic isometric view of a motor-driven chair according to a further embodiment of the present invention, employing a hydraulic suspension arrangement.
Figure 11A:
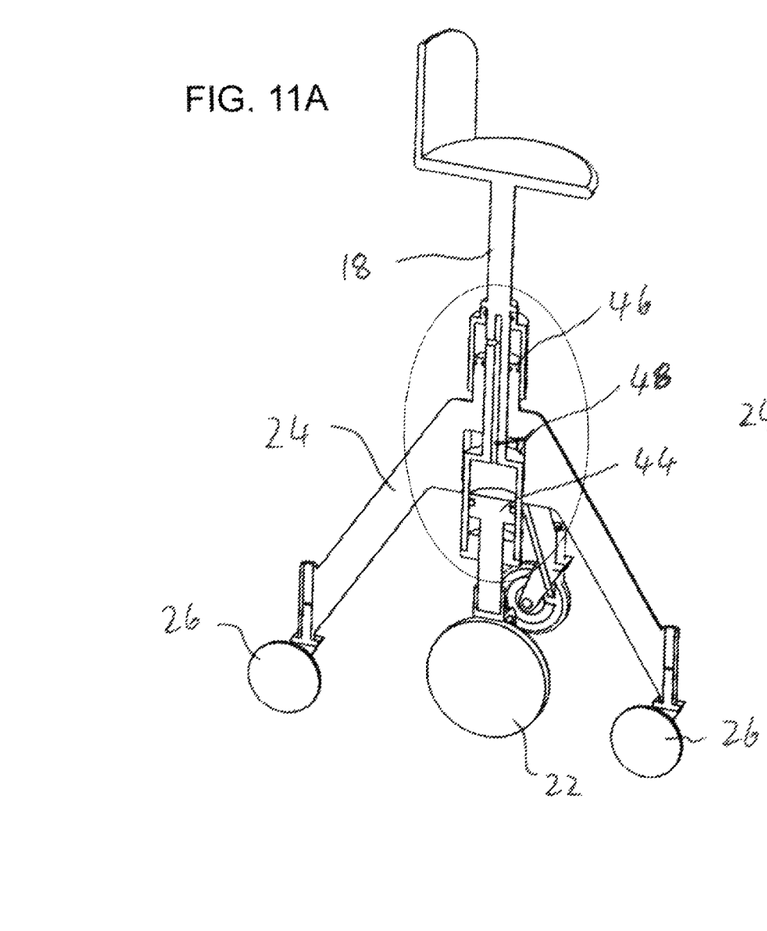
FIG. 11A is a cut-away isometric view of the motor-driven chair of FIG. 10 cut along a vertical mid-plane.
Figure 11B:
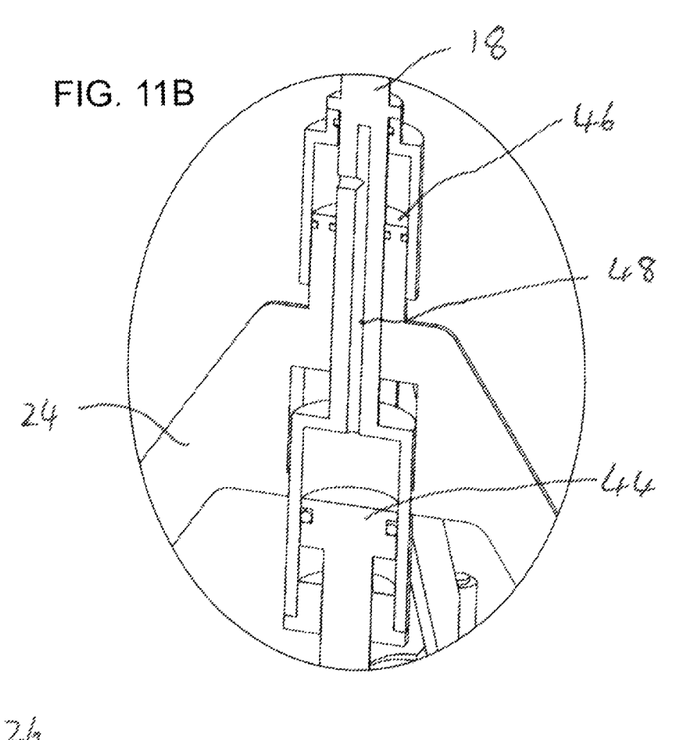
FIG. 11B is an enlarged view of the region of FIG. 11A designated by an ellipse.

Referring now to FIGS. 10-11B, these illustrate an alternative embodiment according to an aspect of the present invention in which the suspension arrangement includes a first hydraulic arrangement, with at least one piston 44, deployed to transfer load between seat pole 18 and drive wheel 22, and a second hydraulic arrangement, with at least one piston 46, deployed to transfer load between seat pole 18 and stabilizer assembly 24. The first and second hydraulic arrangements are interconnected by a pressure-equalization line 48. Since the pressure applied to the two pistons is equalized via line 48, the force (load) transferred to drive wheel 22 and stabilizer assembly 24 are proportional to the surface area of the pistons, thereby subdividing the load in a predefined desired ratio, such as those discussed above.

In the particularly compact implementation illustrated here, piston 46 is implemented as an annular piston slidingly engaged around a central shaft of seat pole 18, while pressure-equalization line 48 runs through the central shaft. Clearly, alternative implementations may be constructed employing more conventional hydraulic actuator structures, such as side-by-side cylinders/pistons, optionally with a number of small cylinders deployed around a central larger cylinder, all as will be clear to a person having ordinary skill in the art of hydraulic systems.

Furthermore, although illustrated in the context of a distinct structural embodiment, which is here illustrated only schematically, it should be noted that the hydraulic suspension arrangement option can readily be implemented also in a device which is, in all other respects, structurally similar to the embodiment of FIGS. 1-5, thus combining this feature with a range of other features of the present invention as described herein in relation to that embodiment.

The term "hydraulic" is used herein in the description and claims to refer to any system or component that is operated by fluid pressure, whether by liquid or by gas (the latter being also referred to as "pneumatic"). Thus the hydraulic implementation option described herein may be implemented using either an incompressible hydraulic fluid, such as water or oil, or a compressible fluid, such as air or another gas or gaseous mixture. In the case of a gas-filled system, it may be advantageous to provide a pre-pressurized starting pressure within the hydraulic system.

Figures 12, 13:
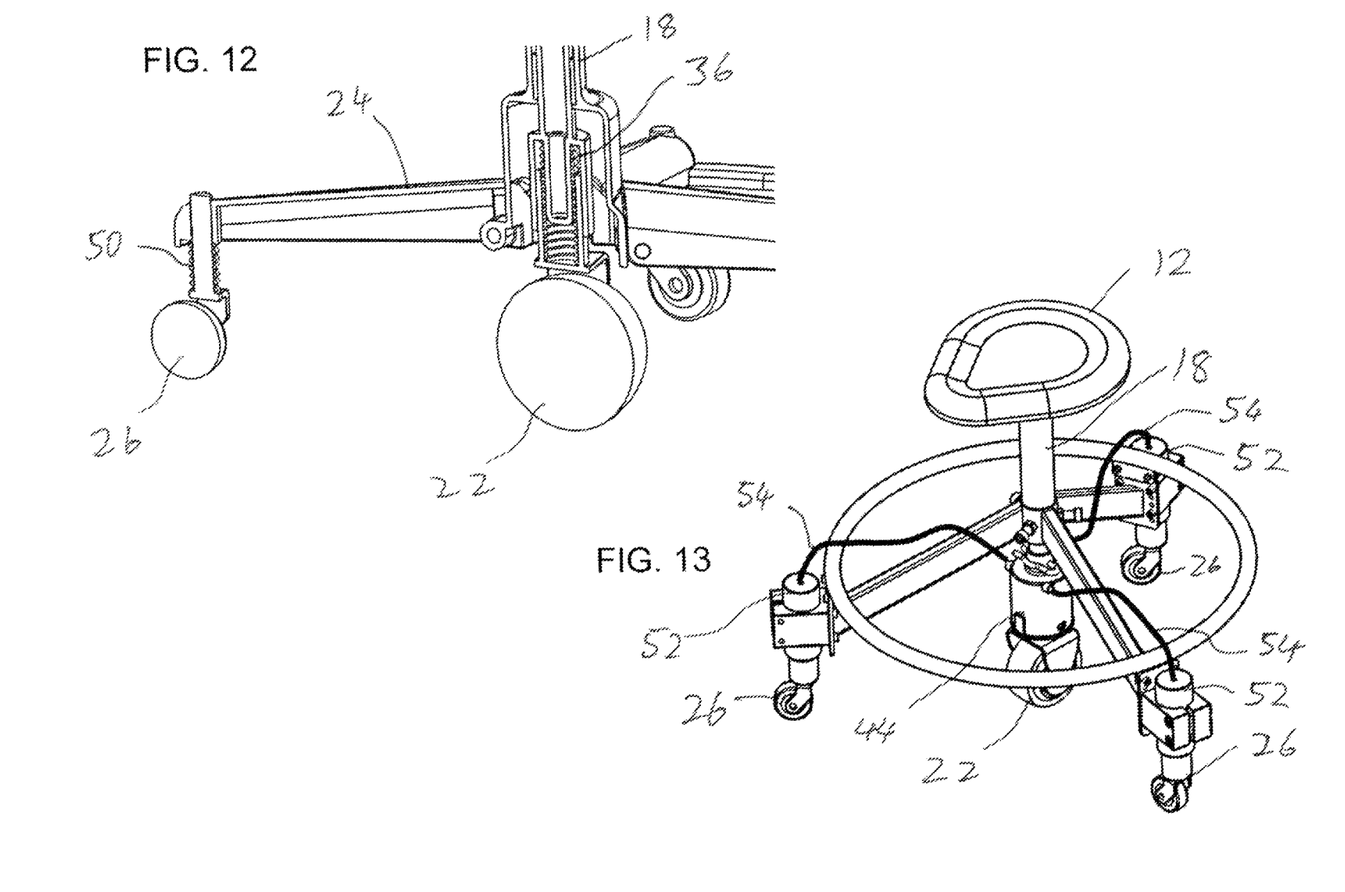
FIG. 12 is a partial, isometric cut-away view of a variant implementation of a motor-driven chair according to the present invention, illustrating an alternative implementation of a suspension arrangement.
FIG. 13 is a schematic isometric view of a further variant implementation of a motor-driven chair according to the present invention, illustrating an additional implementation of a suspension arrangement.

Turning now to FIGS. 12 and 13, while the implementations of the suspension arrangement described thus far distribute load centrally to stabilizer assembly 24, it may in certain cases be preferably to provide individually responsible suspension units for each stabilizer wheel, or for subsets of the stabilizing wheels. Such options are illustrated schematically in FIGS. 12 and 13.

Specifically, FIG. 12 illustrates an implementation, generally similar to that of FIG. 6, in Which elements of stabilizer assembly 24 are rigidly interconnected with seat pole 18, and individual spring suspension elements 50 integrated with each stabilizer wheel 26 operate in parallel with spring 36 to distribute an applied load between drive wheel 22 and the stabilizer wheels 26.

FIG. 13 illustrates a conceptually similar hydraulic implementation in which separate hydraulic cylinders 52 are deployed to transfer load from the elements of stabilizer assembly 24 to stabilizer wheels 26, in parallel to the central hydraulic cylinder/piston arrangement 44 which transfers load to drive wheel 22. A set of pressure-equalization connectors, shown here schematically as tubing 54, ensure equalization of pressure between hydraulic cylinders 52 and central hydraulic cylinder 44. As before, the distribution of the load between the wheels is proportional to the surface area of the various pistons, thereby subdividing the load between the various wheels in a predefined ratio.

In all of the above discussions regarding implementations of the suspension arrangement, the described subdivision of load relates to distribution of a load applied vertically downwards on seat element 12 and passing axially downwards along seat pole 18. This is typically the case for a user sitting stably on seat element 12, where the user's center of gravity typically lies within the area of the seat, which is typically within about 30 cm from vertical axis 20, and therefore acts primarily downwards. Clearly, during mounting and alighting to and from chair 10, or under conditions of externally applied forces, the normal distribution of load may be momentarily disrupted.

Turning now to a further aspect of certain particularly preferred implementations of the present invention, the present invention provides a motor-driven chair that is steered by rotation of the seat, so that the forward direction F of drive wheel 22 is always aligned with the forward direction of seat element 12, and the user changes direction by turning her seat to face the direction towards which she wishes to move. Devices of this type have hitherto been designed with an "outrigger" or stabilizer structure which is omni directional, meaning that the user can turn towards any arbitrary direction and start moving in a straight line in that direction, and a set of caster wheels around the stabilizer structure will immediately align with the new direction.

Although providing very high mobility, the use of an omni directional stabilizer structure has been found to present certain problems. Specifically, in order to change the direction of the seat, and hence of drive wheel 22, the user must apply a considerable turning moment about vertical axis 20 to overcome friction between drive wheel 22 and the underlying surface. This turning moment is preferably achieved by the user applying a lateral force with her feet against the stabilizer structure. It has been found, however, that such lateral force can sometimes have the undesired effect of rotating the stabilizing structure about the drive wheel rather than turning the drive wheel.

To address this problem, certain particularly preferred implementations of the present invention, such as that illustrated in FIGS. 1A-5, employ a combination of at least one fixed-axis follower wheel 28 and at least one castor wheel 26 mounted so as to swivel to accommodate turning of the chair. In the particularly preferred implementation shown here, chair 10 has at least two fixed-axis follower wheels 28, here carried by a rear frame 34, and at least two castor wheels 26, here carried by a front frame 32. Fixed-axis follower wheels 24 are inherently unable to align in a tangential direction relative to seat pole 18, and are therefore highly effective at preventing rotation of the stabilizing structure about the drive wheel. As a result, a turning moment applied by the user's foot against the stabilizer structure reliably achieves the desired result of turning the seat and the drive wheel.

Figure 5:
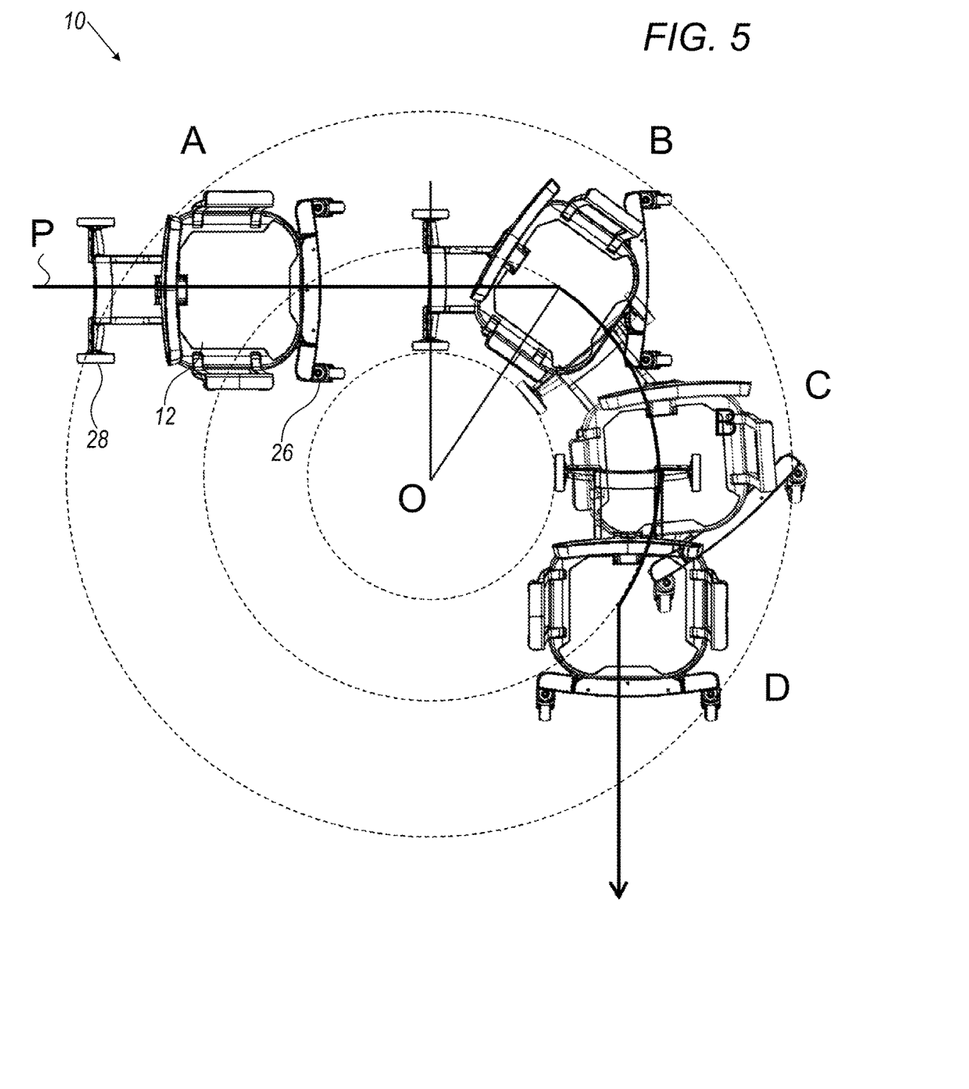
FIG. 5 is a schematic top view showing a sequence of positions of the motor-driven chair of FIG. 1A during turning.

The motion resulting from this configuration is illustrated schematically in FIG. 5, where a solid line P marks the path of the central axis 20 during turning. At position A, motorized chair has the seat aligned for traveling in a straight line from left to right as shown. At position B, the user has chosen to turn to her right, by applying leftward force with her foot to the front frame 32 so as to turn the seat, and hence also the forward direction of the drive wheel, to the right. Since fixed-axis wheels 28 now do not face in the same direction as the seat, and cannot advance in the new forward direction of the drive wheel, wheels 28 trace circular paths as they follow the laterally advancing drive wheel. As a result, as motion continues, the fixed-axis follower wheels 28 on rear frame 34 track around circular paths about a center of turning O defined the intersection of the rotation axis directions of the drive wheel and the fixed-axis wheels. The caster wheels 26 also align themselves with their corresponding circular paths, each according to its distance from center O. This circular motion will continue (e.g., through position C) as long as the user maintains the side-turned state of the seat. At whatever point the user chooses to return the seat to a symmetrical position relative to the front and rear frames, the fixed-axis wheels will fall into line behind the seat and resume a straight path, as from position D as shown. Although shown here schematically as abrupt changes of seat direction occurring at positions B and D, the steering adjustments will in most cases be implemented smoothly, resulting in smoother changes in direction. However the operating principles the same.

Turning now to a further aspect of the present invention, it is a preferred feature of certain embodiments of the present invention that motorized chair 10 is implemented so as to be foldable for convenient transportation and storage. Specifically, the seat-rotation-steered structure of the present invention leads to what is in essence a single-column structure, where the load on the seat is transferred via a single seat pole 18, rendering the core of the support structure relatively compact. However, in order to render chair 10 stable under normal conditions of usage, it is necessary to provide a considerable spread between the various stabilizer wheels 24, 26. Certain preferred embodiments of the present invention provide simple and effective folding mechanisms which render the device easy to fold and open, and provide a compact form for easy transportation and storage.

Figure 3A:
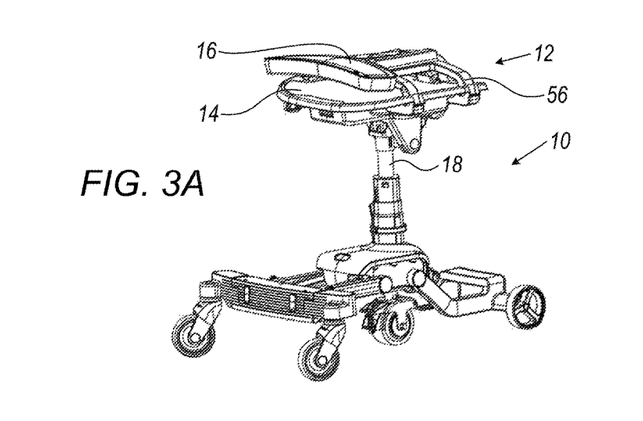
FIGS. 3A-3D are a sequence of isometric views illustrating a sequence of operations for folding the motor-driven chair of FIG. 1A.
Figure 3B:
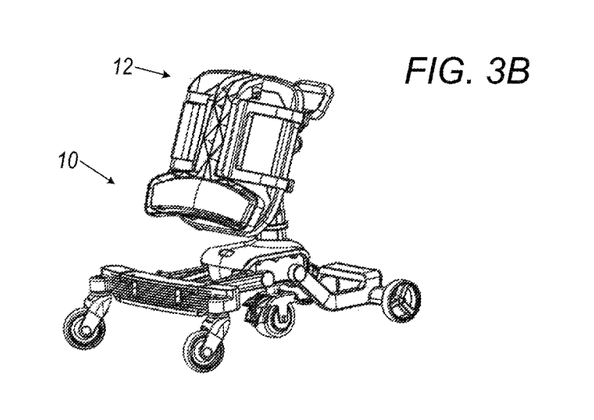
Figure 3C:
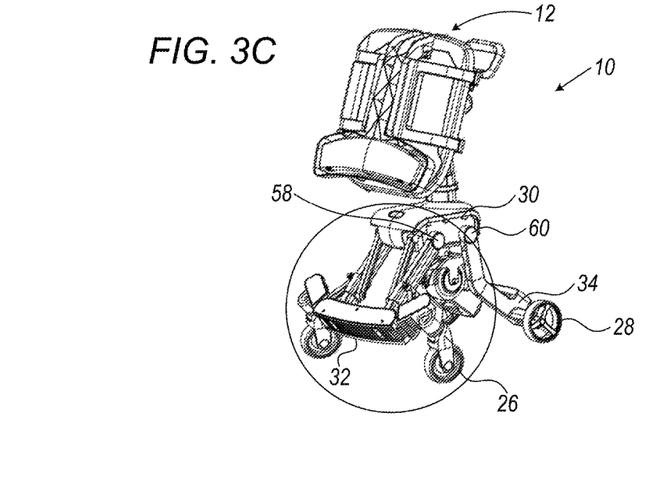
Figure 3D:
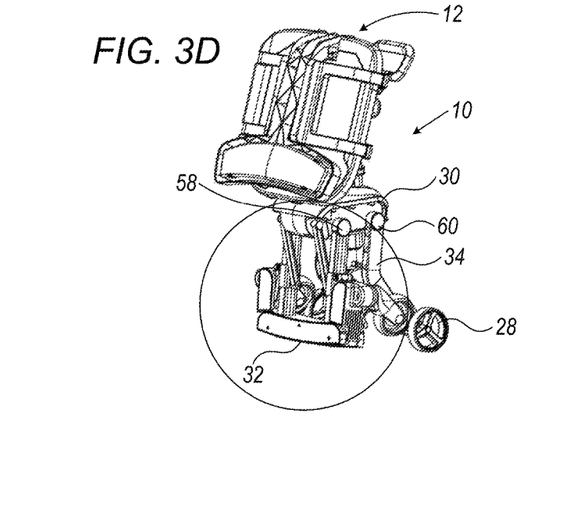
Figure 4A:
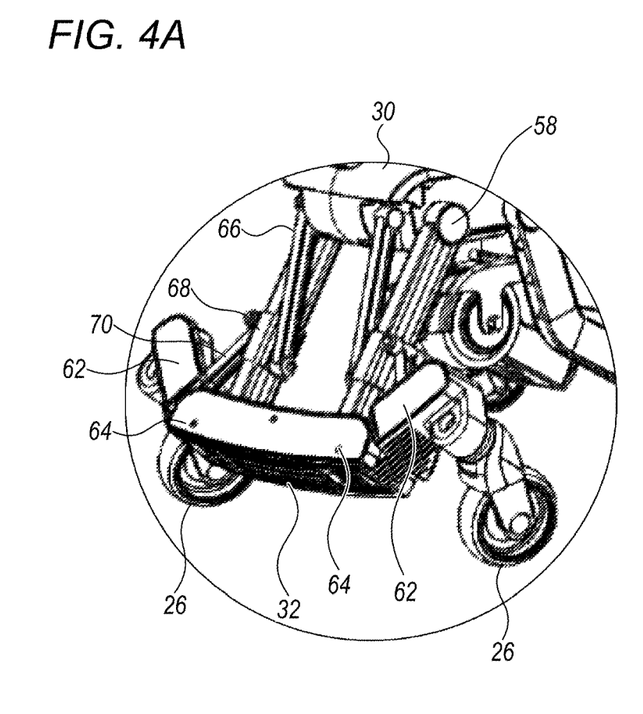
FIGS. 4A and 4B are enlarged views of the regions of FIGS. 3C and 3D marked by a circle, respectively.
Figure 4B:
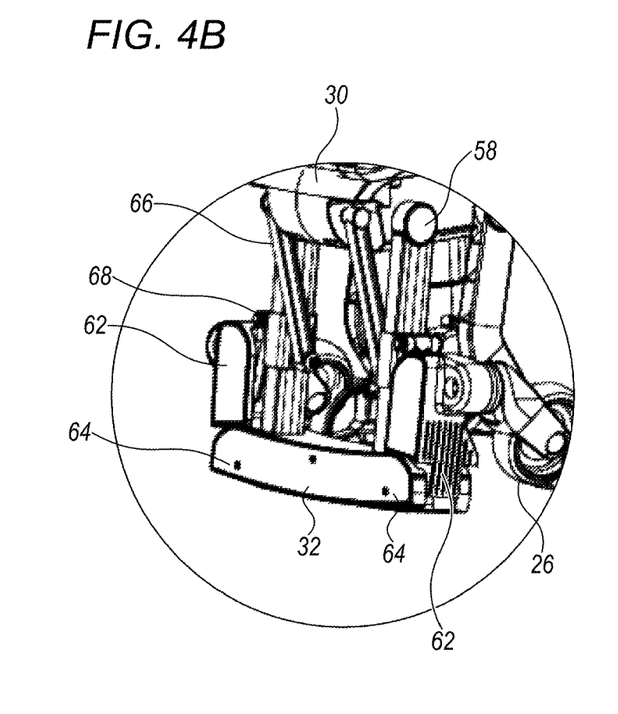

Various aspects of a folding mechanism according to one preferred implementation of the present invention are illustrated in the folding sequence of FIGS. 3A-3D and enlarged views FIGS. 4A-4B. Firstly, seat element 12 is first preferably foldable, such as by folding down rear support surface 16 and, where present, arm rests 56, against support surface 14 (FIG. 3A), and then preferably pivoting the entire seat element 12 to as to tip into close relation to seat pole 18 (FIG. 3B).

Folding of the support structure (stabilizer assembly 24) is here achieved by providing a center portion 30 mechanically linked to seat pole 18, a front portion (frame 32) hingedly connected to center portion 30 at a first hinge axis 58 and supporting two front stabilizer wheels 26, and a rear portion (frame 34) hingedly connected to center portion 30 at a second hinge axis 60 and supporting two rear stabilizer wheels 28. First and second hinge axes 58 and 60 are preferably parallel axes, thereby facilitating folding of the front and rear frames 32 and 34 into close proximity.

According to a further preferred feature illustrated here, castor wheels 26 are mounted to front frame 32 via folding wings 62 foldable along a secondary hinge axis 64 non-parallel to hinge axis 58. In order to simplify deployment and folding of wings 62, stabilizer assembly 24 preferably includes a linkage deployed to fold wings 62 from a deployed position to a tended position (FIGS. 4A and 4B) as front frame 32 is rotated about hinge 58. In the non-limiting example illustrated here, the linkage for each wing 62 employs a bar 66 hingedly attached to center portion 30 at an offset from hinge 58, and linked to a slider 68 which slides along side rails of front frame 32. A linking rod 70 is linked via pivotal connections to slider 68 and wing 62. As a result of this structure, angular rotation of front frame 32 from its fully-raised operation position downwards towards its folded position causes bars 66 to draw sliders 68 along the side rails of front frame 32 in the direction of hinge 58, thereby also pulling on linking rods 70 so as to fold inwards wings 62 to the folded position of FIG. 4B. Conversely, on opening of front frame 32 to its deployed state, the motion is reversed and wings 62 are pushed outwards to their deployed state, ready for use. This mechanism thus provides an enhanced lateral wheelbase for stabilizer assembly 24 while achieving a highly compact folded state.

In the example illustrated here, the folding wings feature is employed only in front frame 32 while rear frame 34 has a fixed geometry. A variant implementation (not shown) employs folding wings on both the front and rear frames.

Figures 9A, 9B:
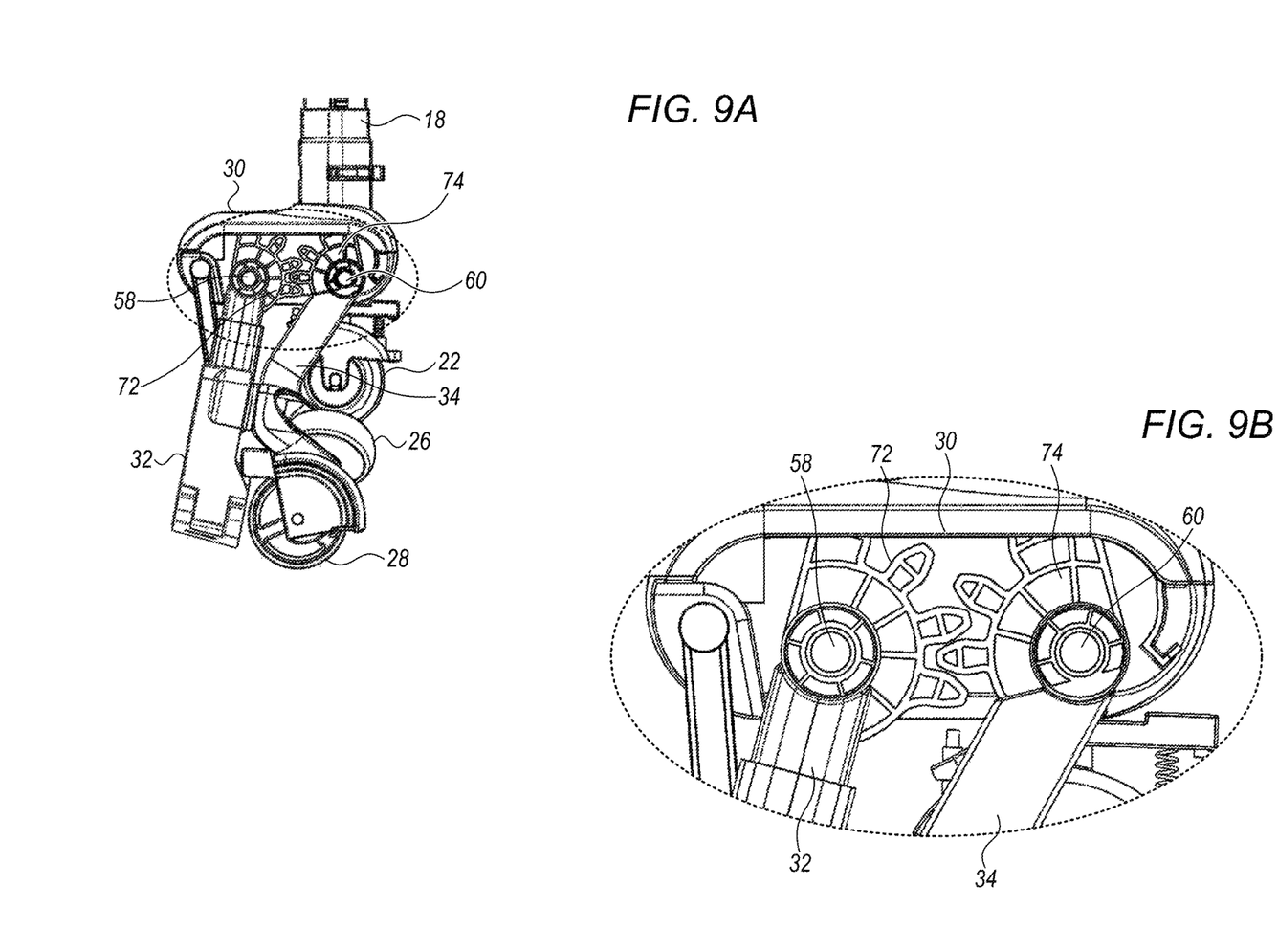
FIGS. 9A and 9B are views similar to FIGS. 8A and 8B, respectively, showing the stabilizer assembly in a folded state.

FIGS. 8A-9B illustrate a further option according to which a mechanical linkage coordinates folding of front and rear frames 32 and 34. In the example illustrated here, each frame is provided with a partial gear wheel configuration 72 and 74, which are centered on the respective axes 58 and 60, and which inter-engage to ensure equal and opposite rotation of the two frames between their deployed state (FIGS. 8A and 8B) and their fully folded state (FIGS. 9A and 9B). The gear wheel configurations as shown also include abutment surfaces 76 which delimit the fully raised deployed position of the frames. The partial gear wheel form of engagement is one of a number of different forms of mechanical linkage which can be used to coordinate folding of the front and back frames, with a range of additional options being within the abilities of a person of ordinary skill in the art.

Turning now to the remaining features of motorized chair 10, the device also includes a mobile power source, typically in the form of one or more rechargeable electrical batteries, which may advantageously be housed in a volume beneath seat support surface 14, or alternatively within central portion 30 of stabilizer assembly 24. A forward/reverse speed control input (not shown) is provided to the user, typically either integrated with an arm rest 56 or as a separate handheld controller, which may be connected via a cable to the side of the seat. Wiring between the battery, the controller and the drive motor typically passes along a cable channel which passes through seat pole 18. For certain applications, simple electric control of current to the motor is sufficient for a practical application. Optionally, an electronic controller with various additional functionality may be used, providing for example, monitoring of battery charge status and battery health, monitoring and limiting speed of motion and/or load on the motor. Implementation of all such options is a routine task for a person having ordinary skill in the art, and for conciseness, these details will not be further discussed here.

Figure 1A:
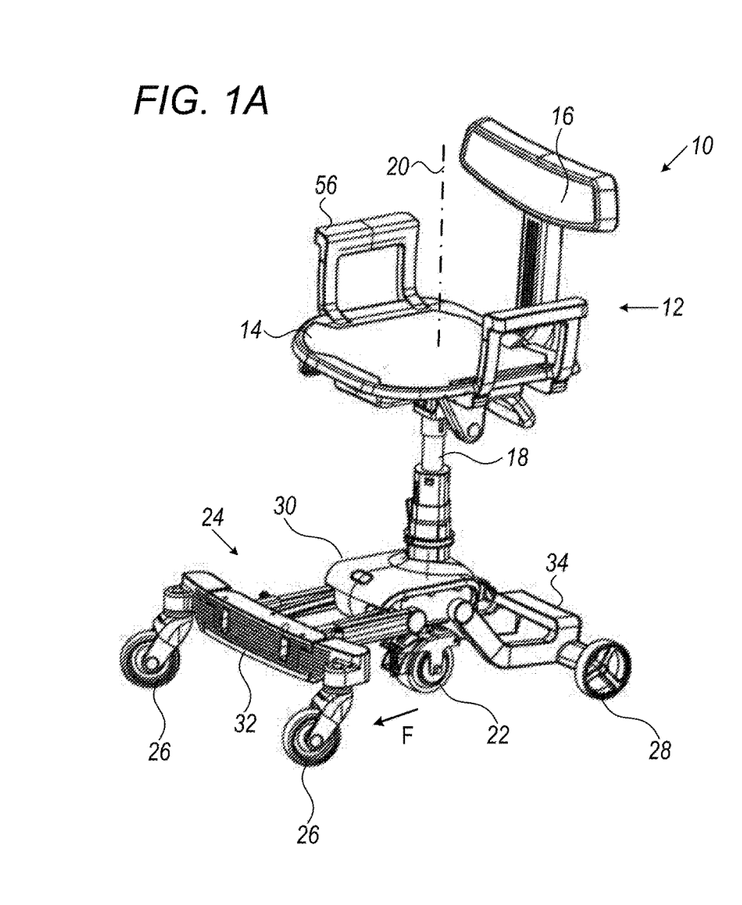
FIGS. 1A and 1B are isometric views of a motor-driven chair, constructed and operative according to an embodiment of the present invention.
Figure 1B:
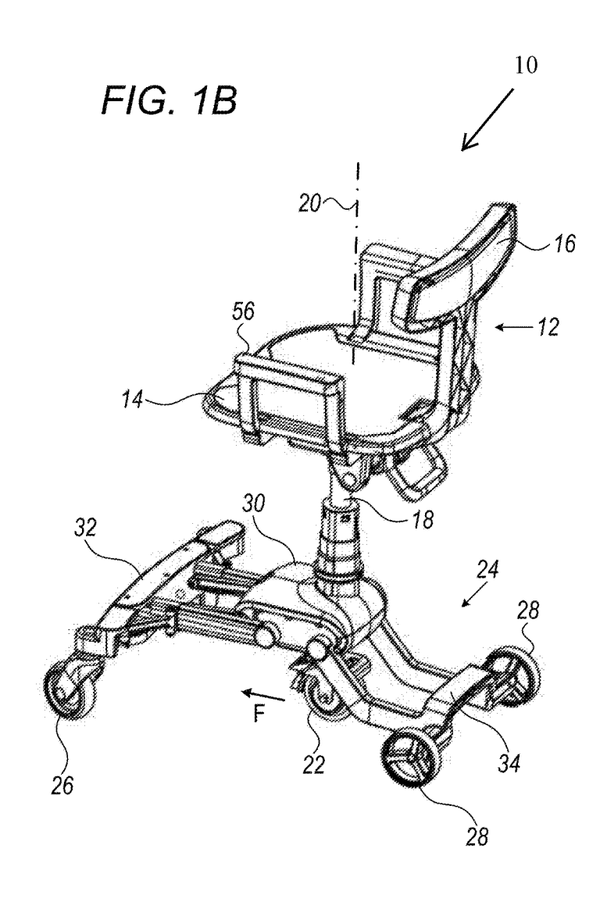
Figures 2A, 2B:
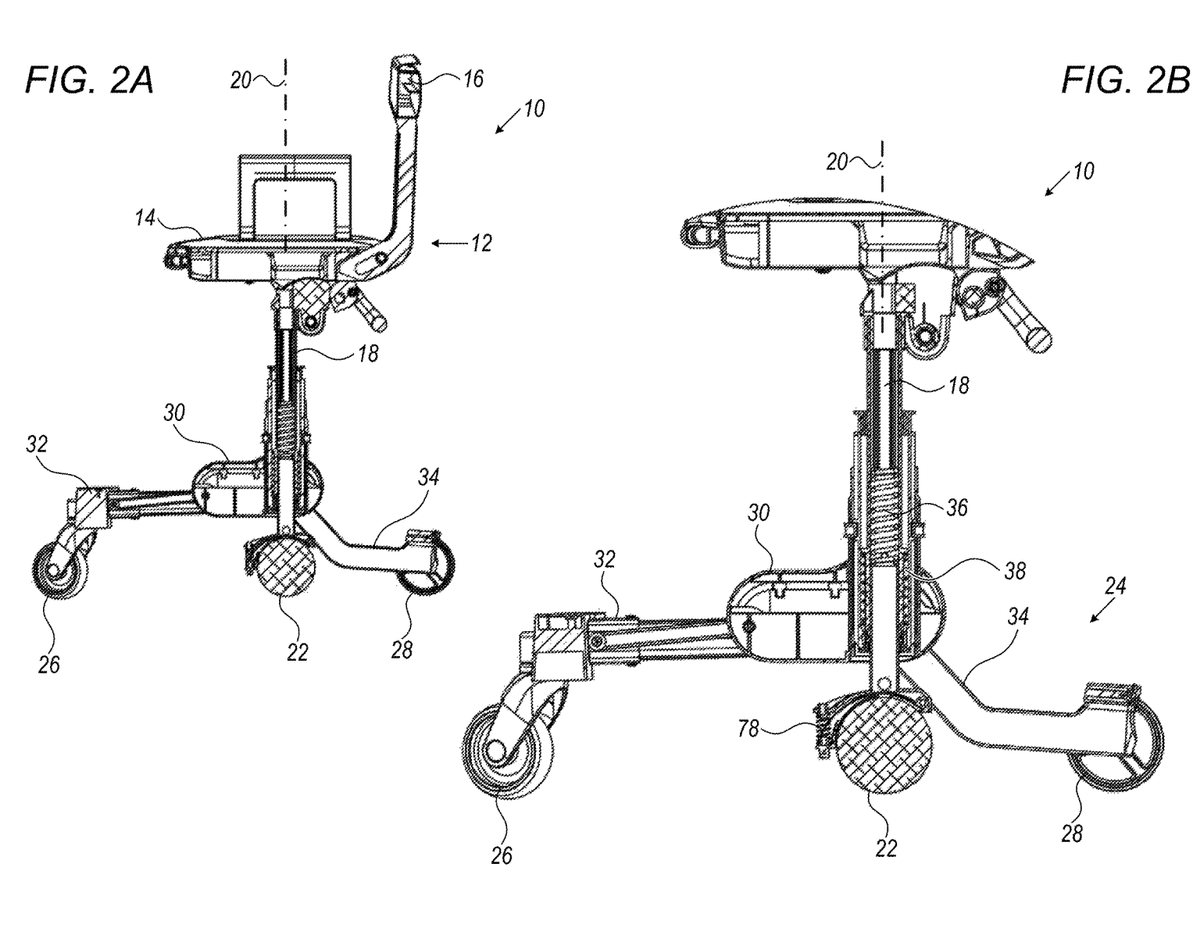
FIG. 2A is a vertical cross-sectional view taken along a mid-plane of the motor-driven chair of FIG. 1A.
FIG. 2B is an enlarged view of the lower region of FIG. 2A.
Figure 7A:
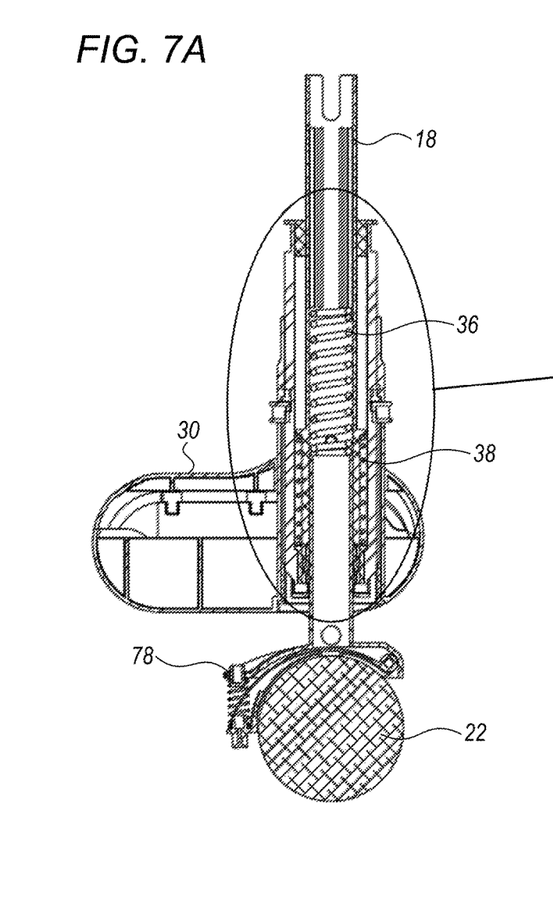
FIG. 7A is a view of a suspension arrangement from the view of the motor-driven chair presented in FIG. 2B.
Figure 7B:
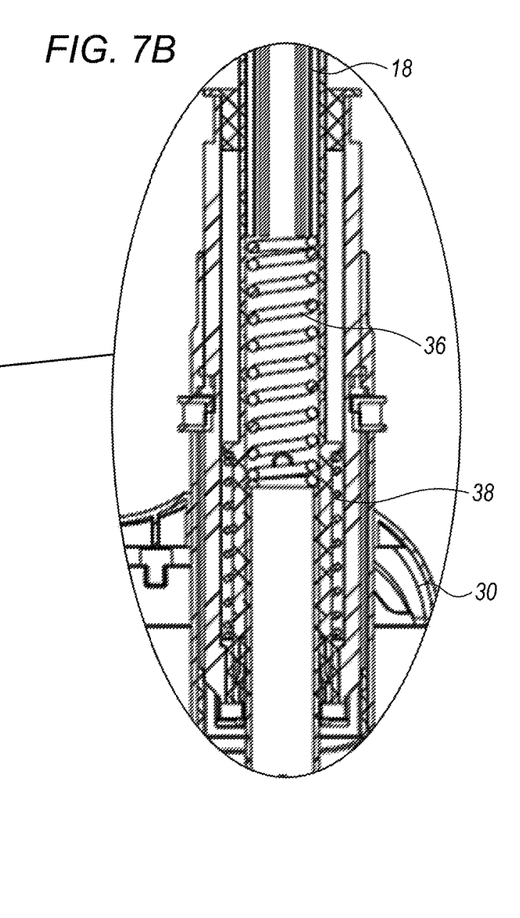
FIG. 7B is an enlarged view of the region of FIG. 7A marked by an ellipse.
Figure 8A:
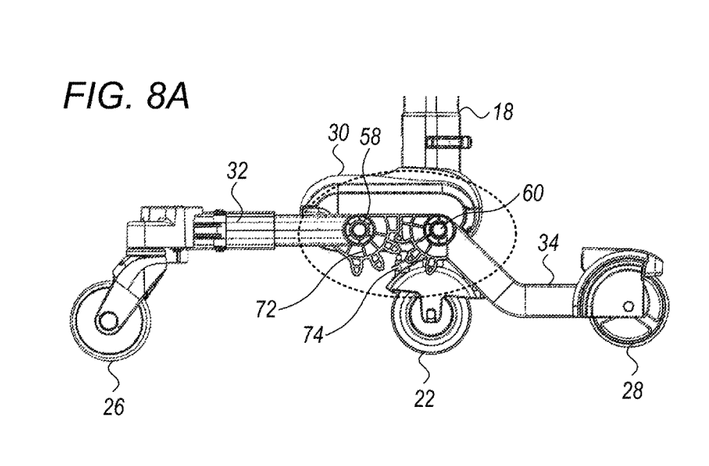
FIG. 8A is a view similar to FIG. 2B illustrating a variant implementation of a stabilizer assembly with interlocking configurations, the stabilizer assembly being shown in a deployed state.
Figure 8B:
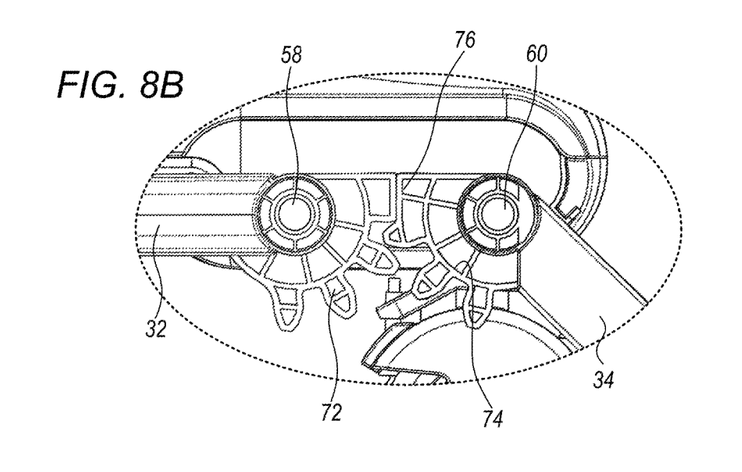
FIG. 8B is an enlarged view of a region of FIG. 8A designated by a dashed ellipse.

Most preferably, a brake configuration is provided on one or more of the wheels of the device to provide stability and safety while the device is stopped, and particularly during mounting and dismounting. As best seen in FIGS. 2B and 7A, the implementation illustrated here provides a mechanical brake configuration 78, typically a friction brake, which acts on drive wheel 22. The brake is preferably operated manually via an actuator cable (not shown) which passes upwards to a handle (not shown) at the side of the seat. Alternatively, a foot-operated brake may be provided, either on the drive wheel or on one or more of the stabilizer wheels.

It will be appreciated that the above descriptions are intended only to serve as examples, and that many other embodiments are possible within the scope of the present invention as defined in the appended claims.

What is claimed is:

1. A motor-driven chair for propelling a user over an underlying surface, the chair comprising:
   (a) a seat element having support surfaces for supporting the user sitting in a seat-facing direction;
   (b) a seat pole extending downwards from said seat element for supporting said seat element, said seat pole defining a vertical axis;
   (c) a drive wheel rotatable about a horizontal axis of rotation so as to define a direction of forward motion perpendicular to said axis of rotation, said drive wheel being located beneath said seat element substantially on said vertical axis, said drive wheel being mechanically linked to said seat pole so as to maintain said direction of forward motion aligned with said seat-facing direction so that rotation of said seat element about said vertical axis causes a corresponding rotation of said direction of forward motion;
   (d) a motor in driving connection to said drive wheel so as to drive said drive wheel to rotate about said horizontal axis of rotation, and thereby propel the chair in the seat-facing direction;
   (e) a stabilizer assembly mechanically linked to said seat pole, said stabilizer assembly comprising a set of stabilizer wheels mounted on a support structure for supporting said seat pole in a vertical orientation, said stabilizer assembly allowing rotation of said seat pole about said vertical axis relative to said support structure; and
   (f) a suspension arrangement associated with said seat pole, said drive wheel and said stabilizer assembly, said suspension arrangement being configured to distribute a load of the user sitting stably on said seat element so as to maintain a predefined range of proportions between a load supported by said drive wheel and a load supported by said stabilizer wheels.

2. The chair of claim 1, wherein said suspension arrangement is configured to distribute a load of the user sitting stably on said seat element so that a substantially constant proportion of the user's weight is supported by said drive wheel and a remainder of the user's weight is supported by said stabilizer wheels for users of weight anywhere between 50 kg and 100 kg, said substantially constant proportion being between 30% and 90% of the user's weight.

3. The chair of claim 1, wherein said suspension arrangement comprises a first suspension spring deployed to transfer load between said seat pole and said drive wheel and a second suspension spring deployed to transfer load between said seat pole and said support structure.

4. The chair of claim 1, wherein said suspension arrangement comprises a first hydraulic arrangement comprising at least one piston, said first hydraulic arrangement being deployed to transfer load between said seat pole and said drive wheel, and a second hydraulic arrangement comprising at least one piston, said second hydraulic arrangement being deployed to transfer load between said seat pole and said support structure, wherein said first and second hydraulic arrangements are interconnected by a pressure-equalization line.

5. The chair of claim 1, wherein said set of stabilizer wheels comprises at least one fixed-axis follower wheel and at least one castor wheel mounted so as to swivel to accommodate turning of the chair.

6. The chair of claim 5, wherein said set of stabilizer wheels comprises at least two fixed-axis follower wheels and at least two castor wheels mounted so as to swivel to accommodate turning of the chair.

7. The chair of claim 1, wherein said support structure comprises a center portion mechanically linked to said seat pole, a front portion hingedly connected to said center portion at a first hinge axis and supporting two front wheels from said set of stabilizer wheels, and a rear portion hingedly connected to said center portion at a second hinge axis and supporting two rear wheels from said set of stabilizer wheels, wherein said first and second hinge axes are parallel axes.

8. The chair of claim 7, wherein said front wheels are castor wheels mounted to said front portion via folding wings foldable along a secondary hinge axis non-parallel to said first hinge axis, said support structure further comprising a linkage deployed to fold said wings from a deployed position to a folded position as said front portion is rotated about said first hinge.

9. A motor-driven chair for propelling a user over an underlying surface, the chair comprising:

(a) a seat element having support surfaces for supporting the user sitting in a seat-facing direction;
(b) a seat pole extending downwards from said seat element for supporting said seat element, said seat pole defining a vertical axis;
(c) a drive wheel rotatable about a horizontal axis of rotation so as to define a direction of forward motion perpendicular to said axis of rotation, said drive wheel being located beneath said seat element substantially on said vertical axis, said drive wheel being mechanically linked to said seat pole so as to maintain said direction of forward motion aligned with said seat-facing direction so that rotation of said seat element about said vertical axis causes a corresponding rotation of said direction of forward motion;
(d) a motor in driving connection to said drive wheel so as to drive said drive wheel to rotate about said horizontal axis of rotation, and thereby propel the chair in the seat-facing direction;
(e) a stabilizer assembly mechanically linked to said seat pole, said stabilizer assembly comprising a set of stabilizer wheels mounted on a support structure for supporting said seat pole in a vertical orientation, said stabilizer assembly allowing rotation of said seat pole about said vertical axis relative to said support structure, wherein said set of stabilizer wheels comprises at least two fixed-axis follower wheels and at least two castor wheels mounted so as to swivel to accommodate turning of the chair.

10. A motor-driven chair for propelling a user over an underlying surface, the chair comprising:
(a) a seat element having support surfaces for supporting the user sitting in a seat-facing direction;
(b) a seat pole extending downwards from said seat element for supporting said seat element, said seat pole defining a vertical axis;
(c) a drive wheel rotatable about a horizontal axis of rotation so as to define a direction of forward motion perpendicular to said axis of rotation, said drive wheel being located beneath said seat element substantially on said vertical axis, said drive wheel being mechanically linked to said seat pole so as to maintain said direction of forward motion aligned with said seat-facing direction so that rotation of said seat element about said vertical axis causes a corresponding rotation of said direction of forward motion;
(d) a motor in driving connection to said drive wheel so as to drive said drive wheel to rotate about said horizontal axis of rotation, and thereby propel the chair in the seat-facing direction;
(e) a stabilizer assembly mechanically linked to said seat pole, said stabilizer assembly comprising a set of stabilizer wheels mounted on a support structure for supporting said seat pole in a vertical orientation, said stabilizer assembly allowing rotation of said seat pole about said vertical axis relative to said support structure, wherein said support structure comprises a center portion mechanically linked to said seat pole, a front portion hingedly connected to said center portion at a first hinge axis and supporting two front wheels from said set of stabilizer wheels, and a rear portion hingedly connected to said center portion at a second hinge axis and supporting two rear wheels from said set of stabilizer wheels, wherein said first and second hinge axes are parallel axes, and wherein said support structure assumes a deployed configuration in which the motor-driven chair is supported by said drive wheel and said stabilizer assembly for propelling a user over an underlying surface, and wherein said support structure is foldable about said first and second hinge axes to assume a compact folded storage state.

11. The chair of claim 10, wherein said front wheels are castor wheels mounted to said front portion via folding wings foldable along a secondary hinge axis non-parallel to said first hinge axis, said support structure further comprising a linkage deployed to fold said wings from a deployed position to a folded position as said front portion is rotated about said first hinge.

* * * * *